United States Patent
Gehringer et al.

(10) Patent No.: US 10,487,928 B2
(45) Date of Patent: Nov. 26, 2019

(54) PLANETARY TORSIONAL VIBRATION ABSORBER SYSTEM FOR A VEHICLE

(71) Applicant: GM GLOBAL TECHNOLOGY OPERATIONS LLC, Detroit, MI (US)

(72) Inventors: Mark A. Gehringer, Milford, MI (US); Darrell Lee Robinette, Dollar Bay, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 59 days.

(21) Appl. No.: 15/944,157

(22) Filed: Apr. 3, 2018

(65) Prior Publication Data

US 2019/0301575 A1    Oct. 3, 2019

(51) Int. Cl.
| | |
|---|---|
| *F16H 33/14* | (2006.01) |
| *F16H 3/44* | (2006.01) |
| *F16H 57/00* | (2012.01) |

(52) U.S. Cl.
CPC .............. *F16H 33/14* (2013.01); *F16H 3/44* (2013.01); *F16H 57/0025* (2013.01); *F16H 2057/0012* (2013.01)

(58) Field of Classification Search
CPC ....... F16H 33/14; F16H 33/44; F16H 57/0025
See application file for complete search history.

(56) References Cited

U.S. PATENT DOCUMENTS

2014/0045646 A1*  2/2014  Hwang ................... F16F 15/30
                                                    475/347

\* cited by examiner

*Primary Examiner* — Mark J Beauchaine
(74) *Attorney, Agent, or Firm* — Cantor Colburn LLP

(57) ABSTRACT

A system includes a stationary component, a rotating component arranged adjacent the stationary component, and a planetary torsional vibration absorber system mounted between the stationary component and the rotating component. The planetary torsional vibration absorber system includes a planetary gear system including a ring gear, a sun gear and a carrier. At least one of the ring gear, the sun gear and the carrier is rotationally fixed to the rotating component and another of the ring gear, the sun gear and the carrier is fixedly secured to the stationary component. A tuned vibration absorber including a tunable damping and stiffness component and an inertia ring is mounted to yet another of the ring gear, the sun gear and the carrier.

17 Claims, 4 Drawing Sheets

PLANETARY TORSIONAL VIBRATION ABSORBER SYSTEM FOR A VEHICLE

INTRODUCTION

The subject disclosure relates to the art of vehicles and, more particularly, to a planetary torsional vibration absorber for a vehicle.

Vehicles include various components that may vibrate during operation. Further, contributing to vehicle vibrations are irregularities in road surface. Manufactures employ a number of dampeners to reduce vibrations passing through frame and chassis components and into the vehicle. Shock absorbers, rubber bushings and other elements reduce the transmission of vibrations from road surfaces into vehicle occupant spaces. Other sources of vibration include powertrain components of the vehicle.

Manufacturers employ various systems that reduce the transmission of torsional vibration produced by prime movers such as internal combustion engines, hybrid engines and the like into occupant spaces. The torsional vibration produced by the prime mover may be transmitted throughout the vehicle by driveline components such as transmissions, gearboxes, propshafts and axle shafts. These driveline components also may produce additional torsional vibrations. To limit the torsional vibration transmitted to the occupant spaces, the prime mover and driveline components are typically attached to the vehicle through vibration-absorbing mounts. When the torsional vibration amplitude in the rotating driveline components is high, vibration-absorbing mounts at the attachments may be insufficient to limit the vibration entering the occupant spaces. Accordingly, it is desirable to provide a system that may attenuate torsional vibrations that may be present in the rotating driveline components.

SUMMARY

In one exemplary embodiment, a system includes a stationary component, a rotating component arranged adjacent the stationary component, and a planetary torsional vibration absorber system mounted between the stationary component and the rotating component. The planetary torsional vibration absorber system includes a planetary gear system including a ring gear, a sun gear and a carrier. At least one of the ring gear, the sun gear and the carrier is rotationally fixed to the rotating component and another of the ring gear, the sun gear and the carrier is fixedly secured to the stationary component. A tuned vibration absorber including a tunable damping and stiffness component and an inertia ring is mounted to yet another of the ring gear, the sun gear and the carrier.

In addition to one or more of the features described herein, exemplary embodiments may include wherein sun gear is fixedly connected to the stationary component.

In addition to one or more of the features described herein, exemplary embodiments may include wherein the ring gear is rotationally fixed to the rotating component.

In addition to one or more of the features described herein, exemplary embodiments may include wherein the ring gear is fixedly connected to the stationary component.

In addition to one or more of the features described herein, exemplary embodiments may include wherein the carrier is rotationally fixed to the rotating component.

In addition to one or more of the features described herein, exemplary embodiments may include wherein the carrier is fixedly connected to the stationary component.

In addition to one or more of the features described herein, exemplary embodiments may include wherein the ring gear is rotationally fixed to the rotating component.

In addition to one or more of the features described herein, exemplary embodiments may include wherein the stationary component comprises a rear drive module.

In addition to one or more of the features described herein, exemplary embodiments may include wherein the rotating component comprises a propshaft.

In another exemplary embodiment, a vehicle includes a chassis, a prime mover supported in the chassis, a transmission operatively connected to the prime mover, a rear drive module operatively connected to the transmission, a propshaft operatively connecting the transmission and the rear drive module, and a planetary torsional vibration absorber system mounted between one of the chassis, the transmission, the rear drive module, and the propshaft. The planetary torsional vibration absorber system includes a planetary gear system having a ring gear, a sun gear and a carrier. At least one of the ring gear, the sun gear and the carrier is rotationally fixed to the propshaft and another of the ring gear, the sun gear and the carrier is fixedly secured to one of the rear drive module, the chassis, and the transmission. A tuned vibration absorber including a tunable damping and stiffness component and an inertia ring is mounted to yet another of the ring gear, the sun gear and the carrier.

In addition to one or more of the features described herein, exemplary embodiments may include wherein sun gear is fixedly connected to the one of the rear drive module, the chassis, and the transmission.

In addition to one or more of the features described herein, exemplary embodiments may include wherein the carrier is rotationally fixed to the propshaft.

In addition to one or more of the features described herein, exemplary embodiments may include wherein the ring gear is fixedly connected to the one of the rear drive module, the chassis, and the transmission.

In addition to one or more of the features described herein, exemplary embodiments may include wherein the carrier is rotationally fixed to the propshaft.

In addition to one or more of the features described herein, exemplary embodiments may include wherein the carrier is fixedly connected to the one of the rear drive module, the chassis, and the transmission.

In addition to one or more of the features described herein, exemplary embodiments may include wherein the ring gear is rotationally fixed to the propshaft.

In addition to one or more of the features described herein, exemplary embodiments may include wherein the another of the ring gear, the sun gear and the carrier is fixedly secured to the rear drive module.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
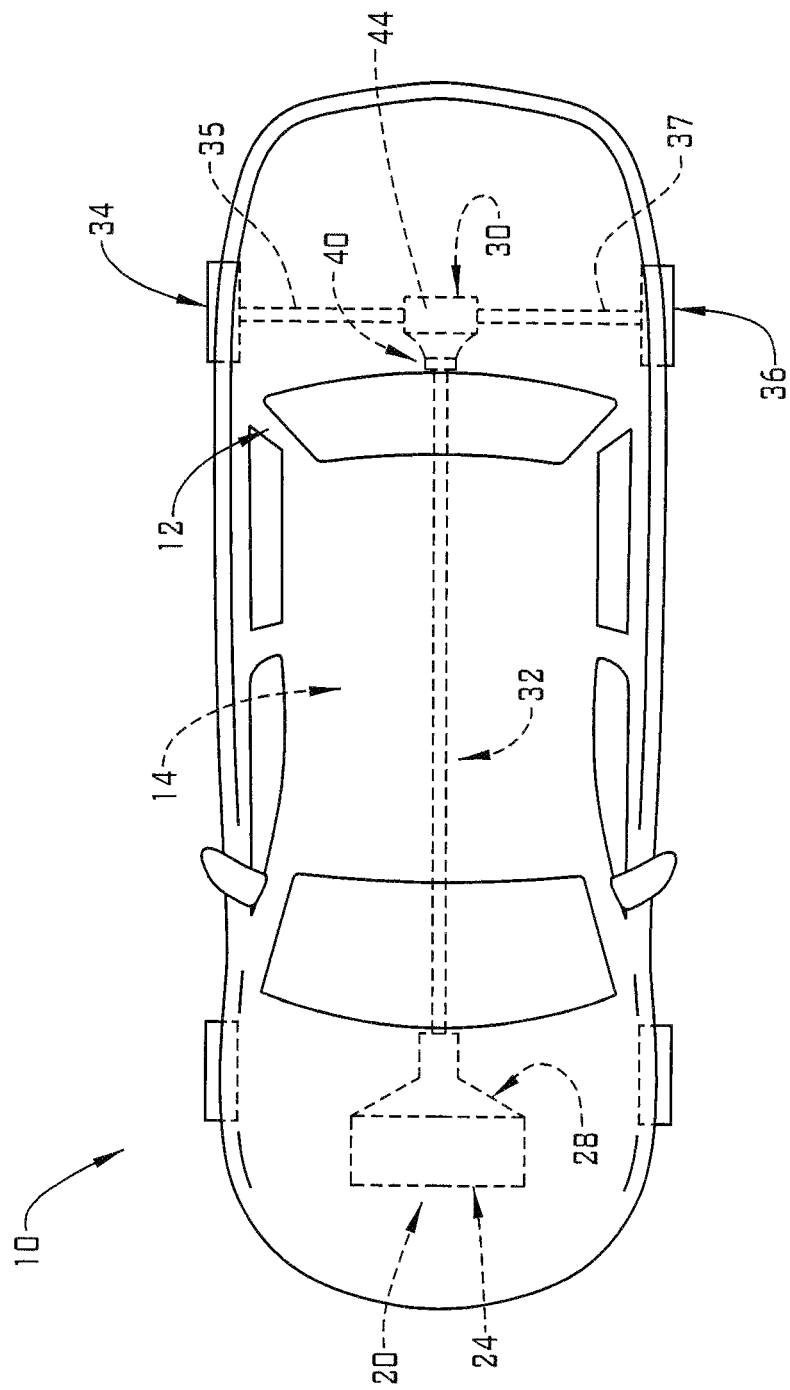
FIG. 1 depicts a vehicle including a planetary torsional tuned vibration absorber system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicted generally at 10 in FIG. 1. Vehicle 10 includes a body or chassis 12 that defines, at least in part, an occupant compartment 14. A prime mover 20 is arranged in chassis 12. Prime mover 20 may take the form of an engine or motor 24. Engine or motor 24 may take on various forms including an internal combustion engine, a hybrid engine, an electric motor or variations thereof. Prime mover 20 is operatively connected to a transmission 28 which, in turn, is mechanically linked to a rear differential or rear drive module (RDM) 30 through a propshaft 32. RDM 30 transfers power from prime mover 20 to a first wheel 34 through a first axle 35 and to a second wheel 36 through a second axle 37. While shown as a rear wheel drive system, it should be understood that exemplary embodiments also contemplate front wheel drive systems and four wheel drive systems.

In accordance with an exemplary embodiment, vehicle 10 includes a planetary torsional vibration absorber system 40 mounted between a stationary component such as housing 44 of RDM 30 and a rotating component such as propshaft 32. It should be understood however that the location of planetary torsional vibration absorber system 40 may vary. For example, planetary torsional vibration absorber system 40 may be mounted between chassis 12 and propshaft 32, or between transmission 28 and propshaft 32.

Figure 2:
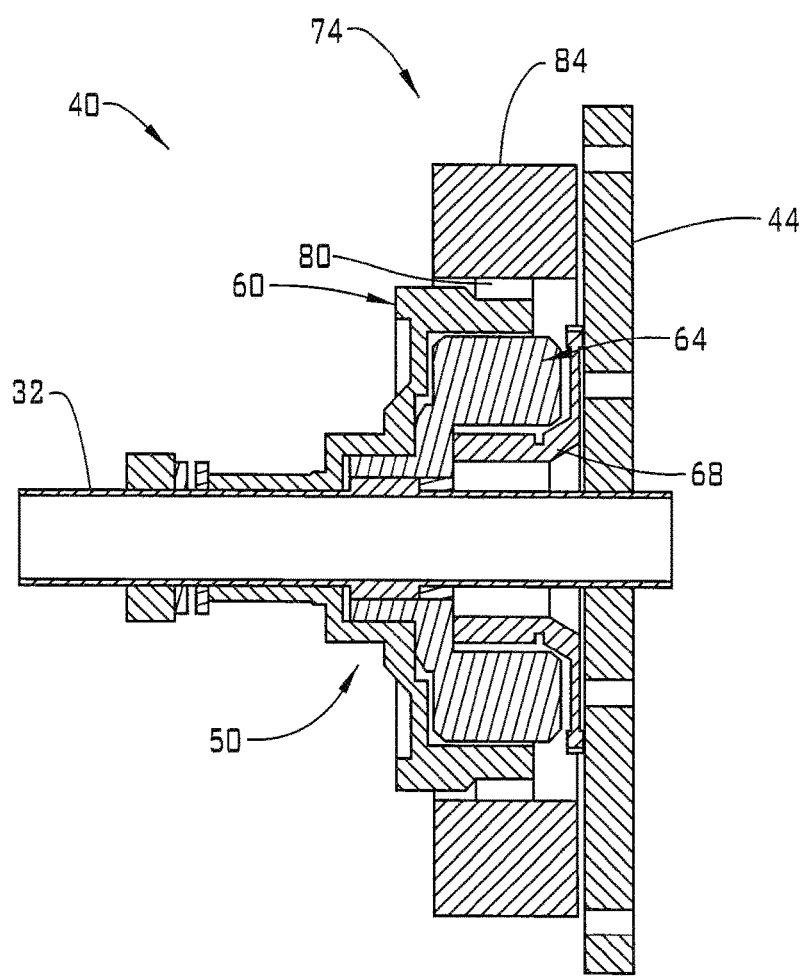
FIG. 2 depicts a planetary torsional tuned vibration absorber system, in accordance with an aspect of an exemplary embodiment.

In accordance with an exemplary embodiment illustrated in FIG. 2, planetary torsional vibration absorber system 40 includes a planetary gear system 50 having a ring gear 60, a carrier 64 supporting a number of planet gears (not shown) and a sun gear 68. Sun gear 68 is fixed to housing 44 of RDM 30 while carrier 64 is rotationally fixed to propshaft 32. Ring gear 60 is free to rotate on propshaft 32. A tuned vibration absorber system 74 is mounted to an outer circumferential surface (not separately labeled) of ring gear 60.

Tuned vibration absorber system 74 include a tunable damping and stiffness component 80 and an inertia ring 84. In operation, rotation of propshaft 32 is translated to carrier 64, which causes planet gears (not shown) to spin ring gear 60 and attached inertia ring 84. Thus, in the exemplary embodiment shown, planetary gear system 50 increases an overall effective inertia of inertia ring 64 so as to provide a selected amount of torsional damping to propshaft 32. The selected amount of torsional damping reduces vibrations that may be transmitted into chassis 12.

Figure 3:
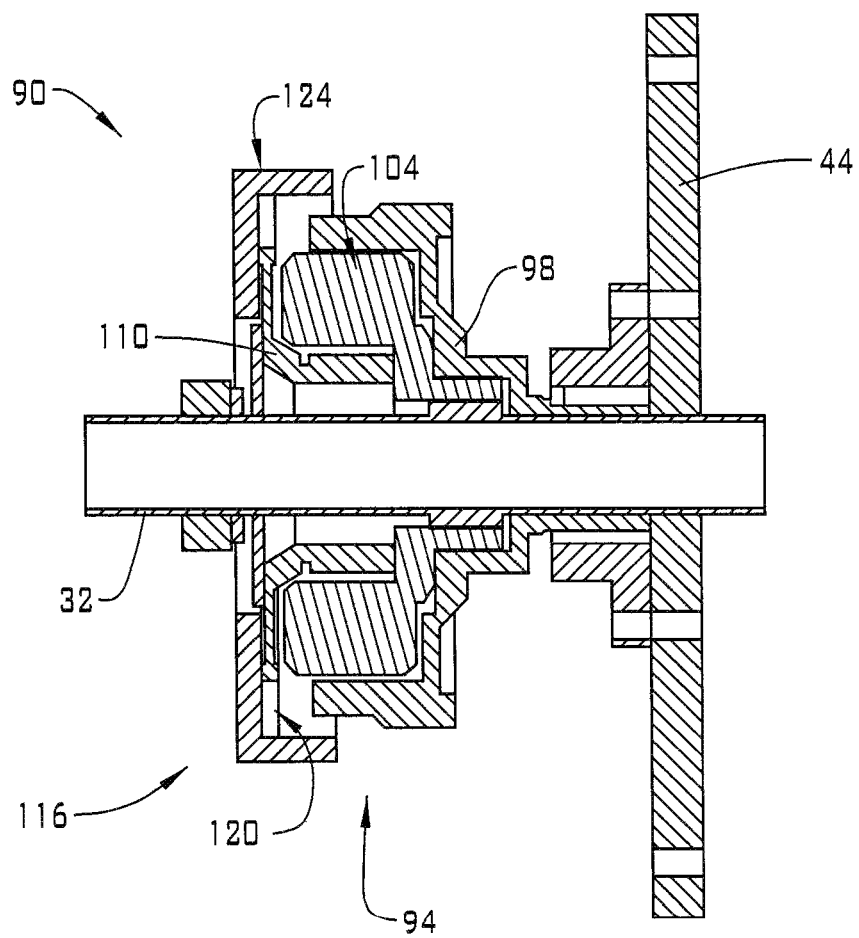
FIG. 3 depicts a planetary torsional tuned vibration absorber system, in accordance with another aspect of an exemplary embodiment.

In accordance with an exemplary embodiment illustrated in FIG. 3, a planetary torsional vibration absorber system 90 is mounted between housing 44 of RDM 30 and propshaft 32. Planetary torsional vibration absorber system 90 includes a planetary gear system 94 having a ring gear 98, a carrier 104 supporting a number of planet gears (not shown) and a sun gear 110. Ring gear 98 is fixed to housing 44 while carrier 104 is rotationally fixed to propshaft 32. Sun gear 110 is free to rotate about propshaft 32. A tuned vibration absorber system 116 is mounted to sun gear 110.

Tuned vibration absorber system 116 includes a tunable damping and stiffness component 120 and an inertia ring 124. In operation, rotation of propshaft 32 is translated to carrier 104, which causes planet gears (not shown) to spin sun gear 110 and attached inertia ring 124. In this manner planetary gear system 50 increases an overall effective inertia of inertia ring 124 so as to provide a selected amount of torsional damping to propshaft 32. The selected amount of torsional damping reduces vibrations that may be transmitted into chassis 12.

Figure 4:
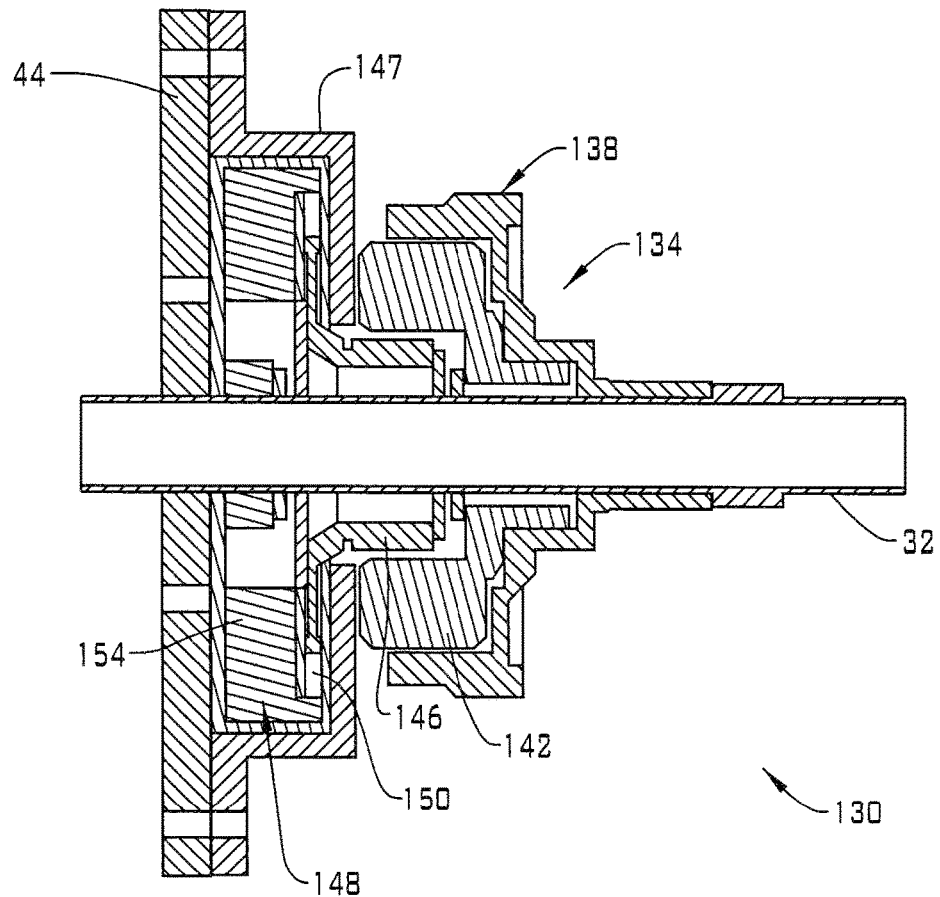
FIG. 4 depicts a planetary torsional tuned vibration absorber system, in accordance with yet another an aspect of an exemplary embodiment.

In accordance with an exemplary embodiment illustrated in FIG. 4, a planetary torsional vibration absorber system 130 is mounted between housing 44 of RDM 30 and propshaft 32. Planetary torsional vibration absorber system 130 includes a planetary gear system 134 having a ring gear 138, a carrier 142 supporting a number of planet gears (not shown) and a sun gear 146. Carrier 142 is fixed to housing 44 through a mounting flange 147. Ring gear 138 is rotationally fixed to propshaft 32. Sun gear 146 is free to rotate on propshaft 32. A tuned vibration absorber system 148 is mounted to sun gear 146.

Tuned vibration absorber system 148 include a tunable damping and stiffness component 150 and an inertia ring 154. In operation, rotation of propshaft 32 is translated to ring gear 138, which spins planet gears on carrier 142, which spin sun gear 146 and attached inertia ring 154. In this manner, planetary gear system 50 increases an overall effective inertia of inertia ring 154 so as to provide a selected amount of torsional damping to propshaft 32. The selected amount of torsional damping reduces vibrations that may be transmitted into chassis 12.

It should be understood that the exemplary embodiments employ a planetary gear system as a force multiplier to increase an overall effective inertia of a tuned vibration absorber. The damping and stiffness provided by the tuned vibration absorber is selected to attenuate vibrations in a selected frequency range when inertia ring is rotated with a selected amount of inertia. By using the planetary gear system as a force multiplier, an overall size of the inertia ring may be reduced thereby increasing packaging options for the planetary torsional vibration absorber system.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system comprising:
a stationary component;
a rotating component arranged adjacent the stationary component; and
a planetary torsional vibration absorber system mounted between the stationary component and the rotating component, the planetary torsional vibration absorber system comprising:
a planetary gear system including a ring gear, a sun gear and a carrier, at least one of the ring gear, the sun gear and the carrier being rotationally fixed to the rotating component and another of the ring gear, the sun gear and the carrier being fixedly secured to the stationary component; and
a tuned vibration absorber including a tunable damping and stiffness component and an inertia ring mounted to yet another of the ring gear, the sun gear and the carrier.

2. The system according to claim 1, wherein sun gear is fixedly connected to the stationary component.

3. The system according to claim 2, wherein the ring gear is rotationally fixed to the rotating component.

4. The system according to claim 1, wherein the ring gear is fixedly connected to the stationary component.

5. The system according to claim 4, wherein the carrier is rotationally fixed to the rotating component.

6. The system according to claim 1, wherein the carrier is fixedly connected to the stationary component.

7. The system according to claim 6, wherein the ring gear is rotationally fixed to the rotating component.

8. The system according to claim 1, wherein the stationary component comprises a rear drive module.

9. The system according to claim 8, wherein the rotating component comprises a propshaft.

10. A vehicle comprising:
a chassis;
a prime mover supported in the chassis;
a transmission operatively connected to the prime mover;
a rear drive module operatively connected to the transmission;
a propshaft operatively connecting the transmission and the rear drive module; and
a planetary torsional vibration absorber system mounted between one of the chassis, the transmission, and the rear drive module and the propshaft, the planetary torsional vibration absorber system comprising:
a planetary gear system including a ring gear, a sun gear and a carrier, at least one of the ring gear, the sun gear and the carrier being rotationally fixed to the propshaft and another of the ring gear, the sun gear and the carrier being fixedly secured to one of the rear drive module, the chassis, and the transmission; and
a tuned vibration absorber including a tunable damping and stiffness component and an inertia ring mounted to yet another of the ring gear, the sun gear and the carrier.

11. The vehicle according to claim 10, wherein sun gear is fixedly connected to the one of the rear drive module, the chassis, and the transmission.

12. The vehicle according to claim 11, wherein the carrier is rotationally fixed to the propshaft.

13. The vehicle according to claim 10, wherein the ring gear is fixedly connected to the one of the rear drive module, the chassis, and the transmission.

14. The vehicle according to claim 13, wherein the carrier is rotationally fixed to the propshaft.

15. The vehicle according to claim 10, wherein the carrier is fixedly connected to the one of the rear drive module, the chassis, and the transmission.

16. The vehicle according to claim 15, wherein the ring gear is rotationally fixed to the propshaft.

17. The vehicle according to claim 10, wherein the another of the ring gear, the sun gear and the carrier is fixedly secured to the rear drive module.

* * * * *